(No Model.) 6 Sheets—Sheet 1.
J. L. TOWNSLEY.
CASH REGISTER AND INDICATOR.
No. 452,402. Patented May 19, 1891.

Witnesses
Inventor
James L. Townsley
By Price & Fisher
Attys.

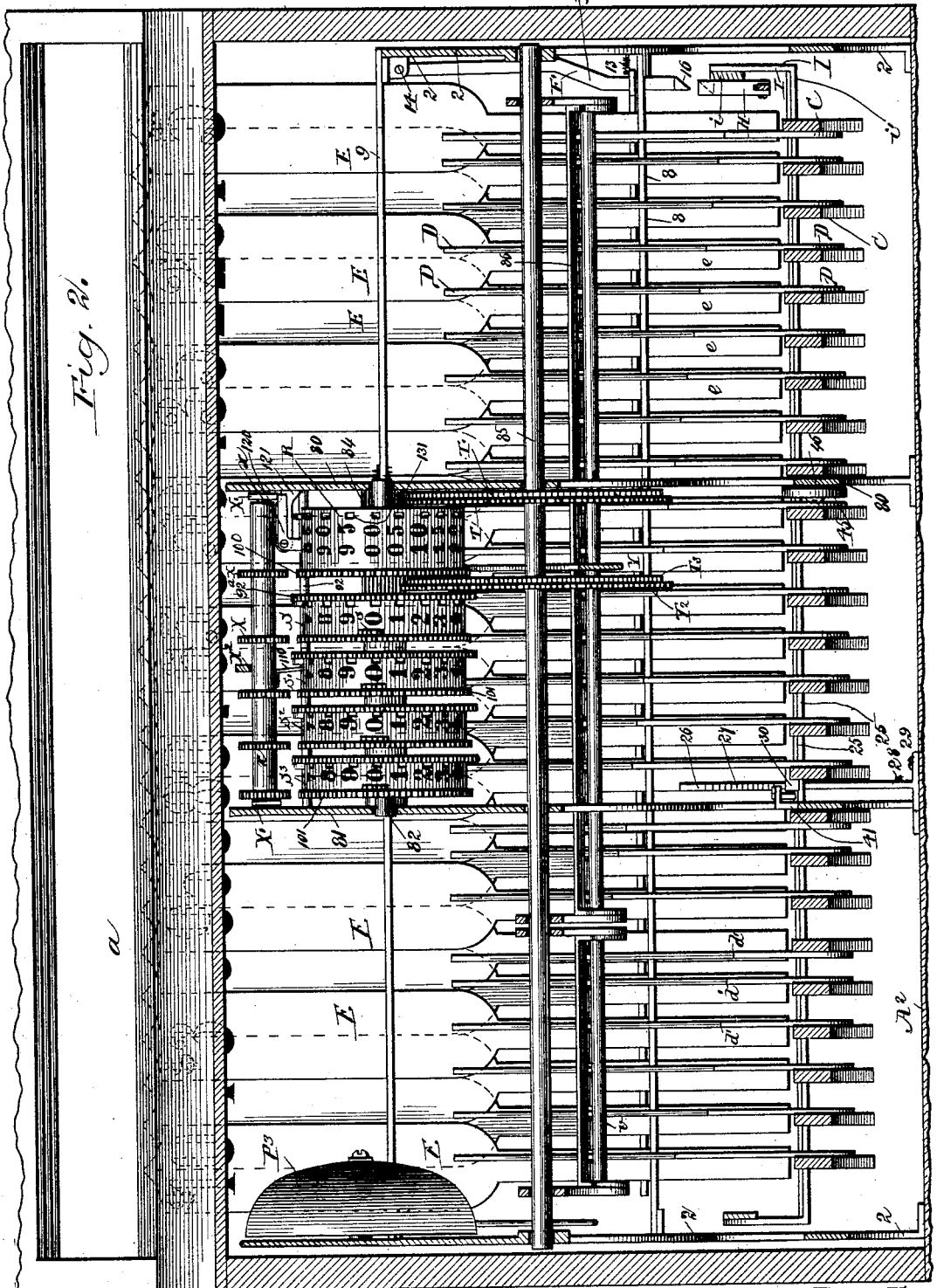

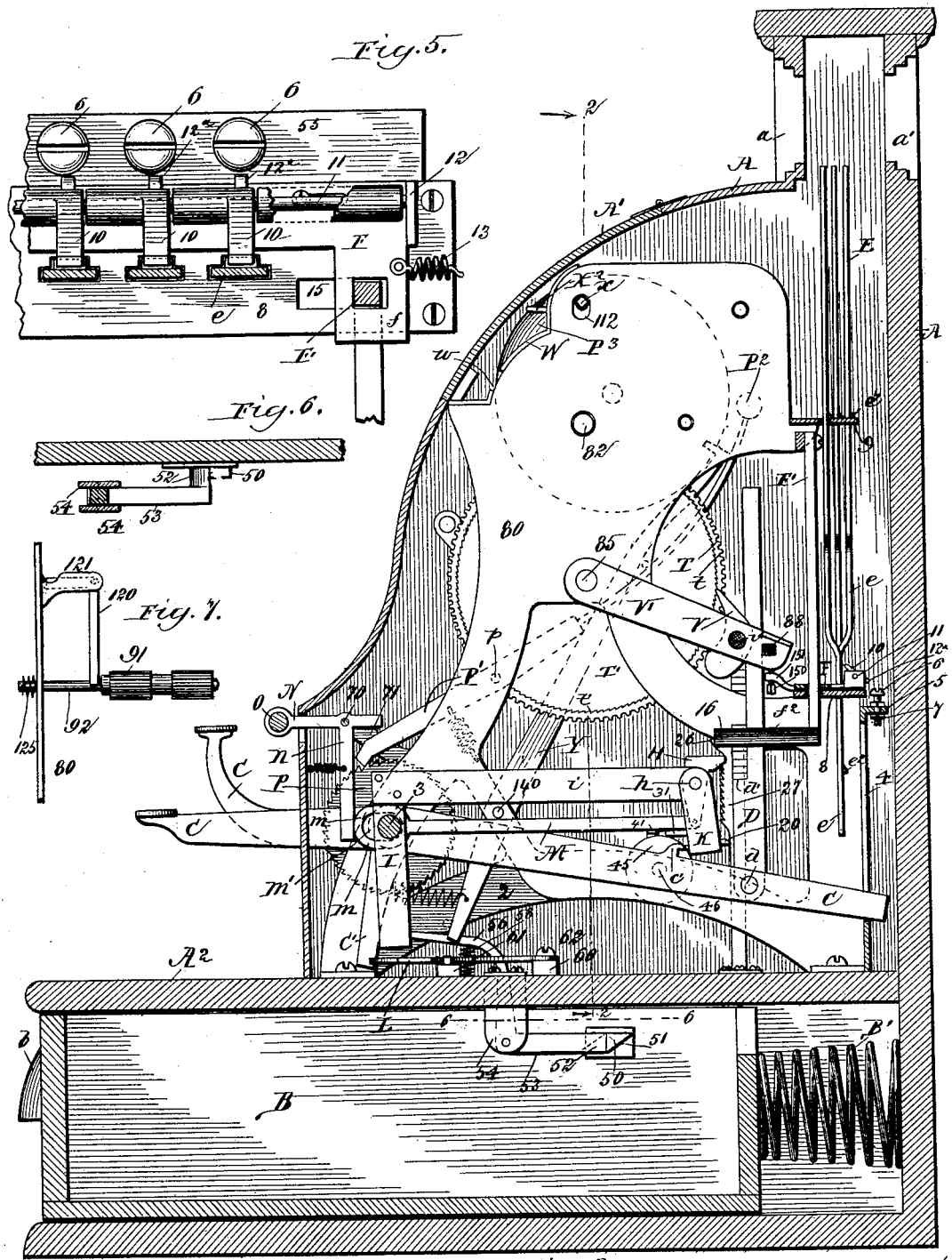

(No Model.) 6 Sheets—Sheet 4.
J. L. TOWNSLEY.
CASH REGISTER AND INDICATOR.
No. 452,402. Patented May 19, 1891.
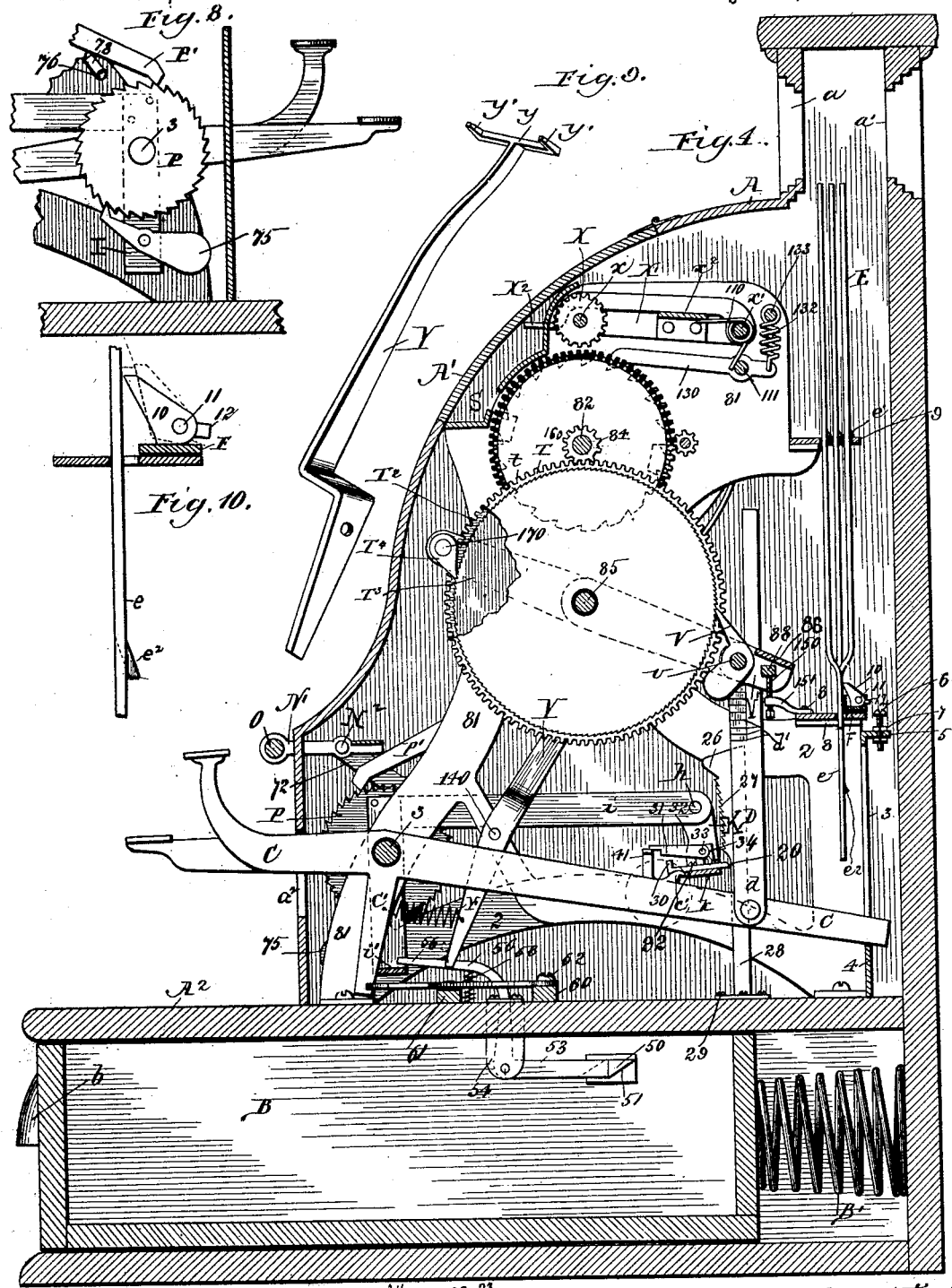
Witnesses
Inventor
James L. Townsley
By Price & Fisher
Att'ys
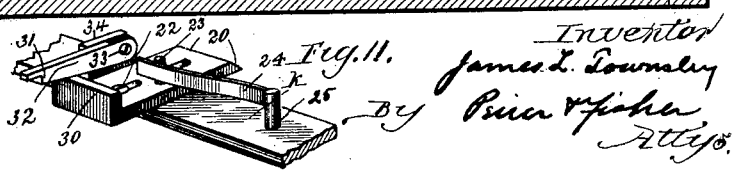

(No Model.) 6 Sheets—Sheet 5.
J. L. TOWNSLEY.
CASH REGISTER AND INDICATOR.
No. 452,402. Patented May 19, 1891.
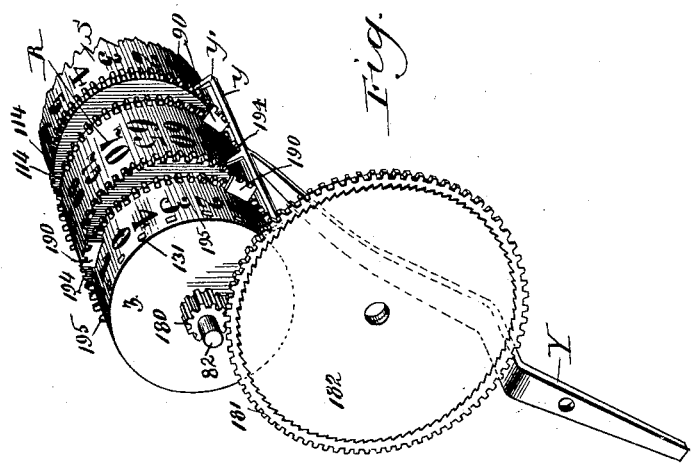
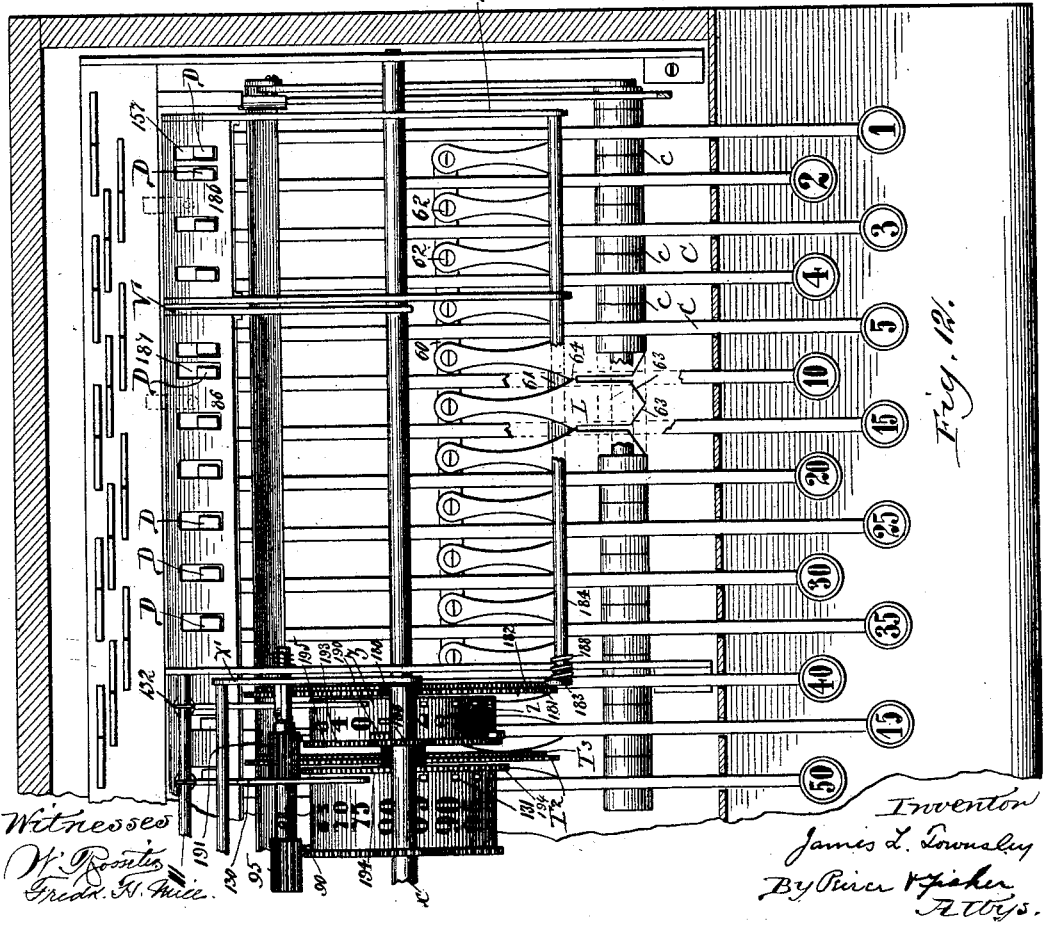

(No Model.)
6 Sheets—Sheet 6.

J. L. TOWNSLEY.
CASH REGISTER AND INDICATOR.

No. 452,402. Patented May 19, 1891.

Witnesses
W. Rossiter
Fredk H. Wells

Inventor
James L. Townsley
By Prin & Fisher
Attys

UNITED STATES PATENT OFFICE.

JAMES L. TOWNSLEY, OF CHICAGO, ILLINOIS, ASSIGNOR, BY DIRECT AND MESNE ASSIGNMENTS, TO THE KENWOOD MANUFACTURING COMPANY, OF SAME PLACE.

CASH REGISTER AND INDICATOR.

SPECIFICATION forming part of Letters Patent No. 452,402, dated May 19, 1891.

Application filed March 25, 1889. Serial No. 304,638. (No model.)

*To all whom it may concern:*

Be it known that I, JAMES L. TOWNSLEY, a citizen of the United States, residing at Chicago, in the county of Cook and State of Illinois, have invented certain new and useful Improvements in Cash Registering and Indicating Devices, of which I do declare the following to be a full, clear, and exact description, reference being had to the accompanying drawings, forming part of this specification.

My present invention has relation to that class of devices adapted to indicate to purchasers the amounts of their purchases and to register at the same time the amounts received by the cashier. An example of this type of apparatus is illustrated in Letters Patent No. 394,894, granted jointly to me and to William C. Niblack, as my assignee, December 18, 1888.

My present invention consists in various novel features of construction hereinafter described, illustrated in the accompanying drawings, and particularly specified in the claims at the end of this specification.

Figure 1:
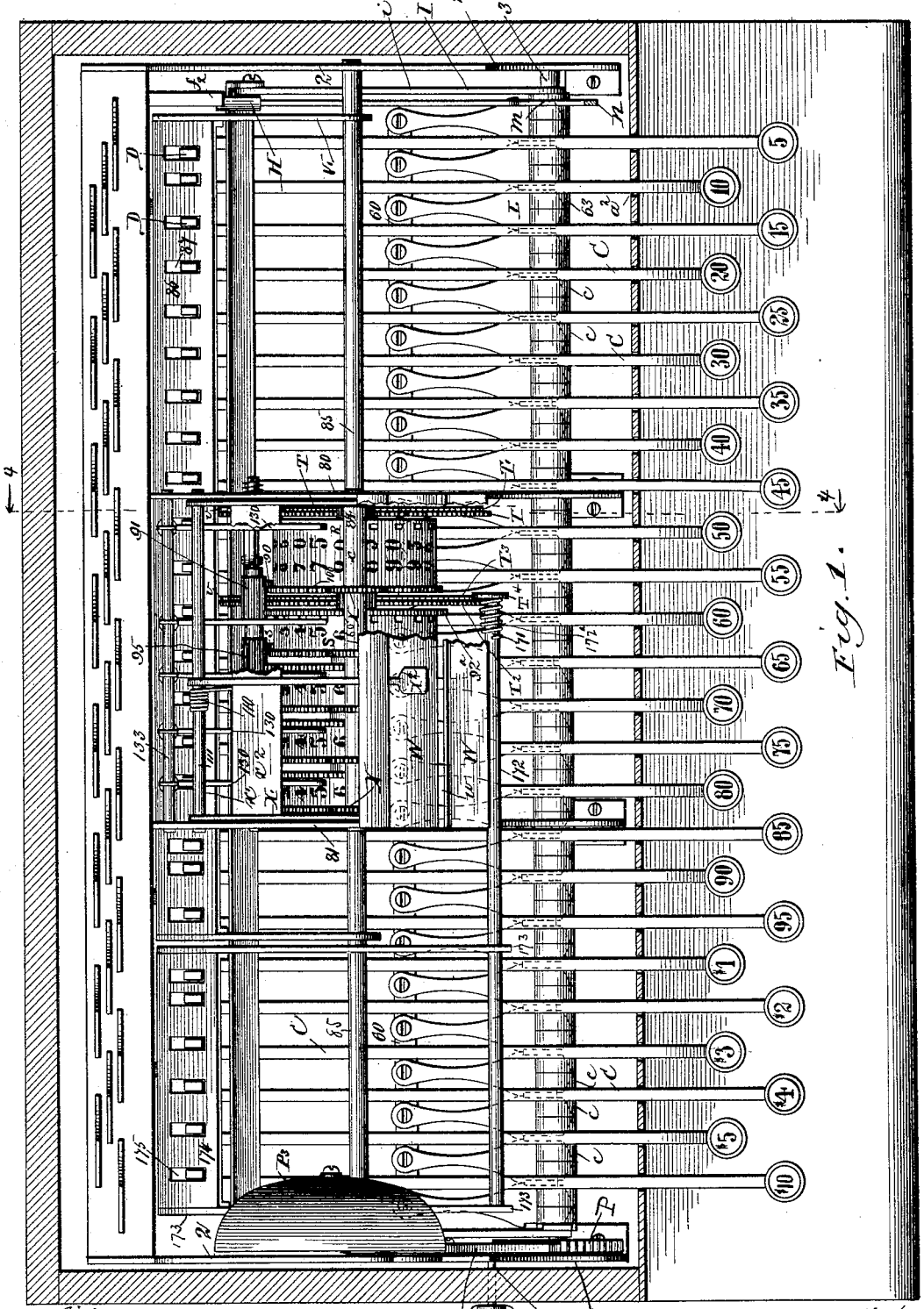
Figure 14:
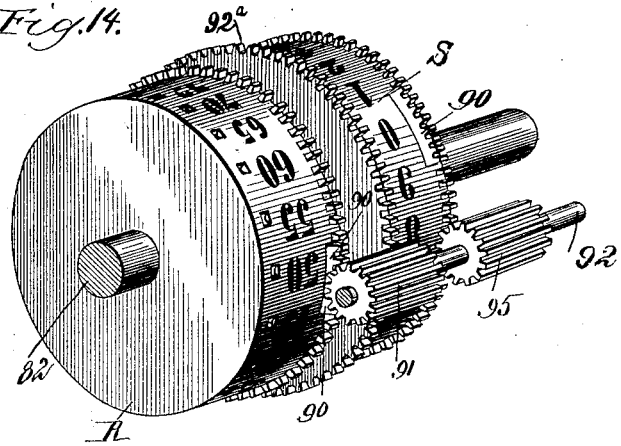
Figure 15:
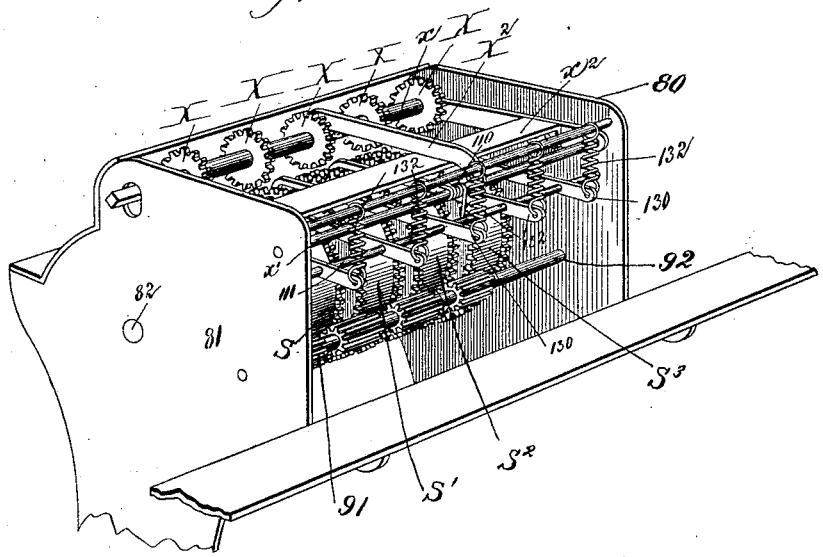

Figure 1 is a plan view, with parts shown in horizontal section, of an apparatus embodying my invention, parts being broken away for better illustration. Fig. 2 is a view partly in front elevation and partly in vertical longitudinal section. Fig. 3 is a view in vertical transverse section through the inclosing casing at one side of the plates that sustain the registering and indicating mechanism. Fig. 4 is a view in transverse section on line 4 4 of Fig. 1. Fig. 5 is an enlarged detail plan view of a part of the locking-bar for the indicator-tablets, the tablets being shown in section and the adjacent parts being shown in plan view. Fig. 6 is a detail view in horizontal section on line 6 6 of Fig. 3. Fig. 7 is a detail view in rear elevation of the carrying-shaft and pinions and a shifting-arm for said pinions. Fig. 8 is a detail view in side elevation of the bell-ringing ratchet-pawl and adjacent parts. Fig. 9 is an enlarged detail view in perspective of the pawl for locking the movement of the register-wheels. Fig. 10 is an enlarged detail view in vertical transverse section through the supporting-bar for the tablets, the locking-pawl and the portion of the tablet-rod being shown in side elevation. Fig. 11 is a detail perspective view of the check-pawl by which the dropping of a key-lever is prevented until its movement is completed, the adjacent parts being shown in plan. Fig. 12 is a plan view (parts being shown in horizontal section) of a form of apparatus provided with mechanism for registering fractions of a dollar below the value of five cents. Fig. 13 is a detail perspective view of the wheel for registering fractions of a dollar below the value of five cents and of the adjacent parts. Fig. 14 is an enlarged perspective view from the rear side of the cents-wheel and the adjacent dollar-wheel and the carrying mechanism. Fig. 15 is a perspective view from the rear side of the registering-wheels, the carrying-wheels, and the adjacent parts.

The inclosing casing A may be of any suitable construction—such, for example, as is illustrated in my above-mentioned Letters Patent—this casing being provided at its upper portion with a sight-opening $a$, through which the indicator-tablets may be exposed to view from the front of the machine, and preferably also with a sight-opening $a'$, through which the tablets may be seen from the back of the machine. This casing is also shown as provided with a door or cover $A'$, which when lifted will permit the inspection of the register-wheels within the casing. In the front of the casing are formed the usual slots or openings $a^2$, through which project the stems of the various key-levers, whereby the proper operation of the indicating and registering mechansim is effected.

Beneath the bottom plate $A^2$ of the casing and within a suitable compartment formed for the purpose is preferably held the change drawer or till B, the withdrawal of which may be effected either simply by its handle $b$ or by means of a suitable spring $B'$, placed between the back of the drawer and the back plate of the main casing, in manner well understood in the art. Within suitable standards 2, that rise from the bottom plate $A^2$ of the casing, is held the transverse shaft 3, whereon are journaled the hubs $c$ of the key-levers C. Each of these key-levers C is extended, as shown, to a point adjacent the back of the machine, and is provided with a register-arm D, pivotally connected thereto, as at $d$, and serving to transmit motion from the key-levers to the register-wheels, in a manner to be hereinafter stated. The rear ends of the key-levers C extend through suitable vertical slots in a back plate 4, that rises from the bottom plate $A^2$ of the casing and extends from side to side of the machine, and this plate 4 is provided at its upper edge with a flange 5, through which extend suitable set-screws 6, that serve to determine with exactness the extent of movement of the key-levers C, these set-screws being by preference provided with set-nuts 7, one on either side of the flange 5. Between the end plates 2 at the sides of the machine extends a guide-plate 8, through which pass the rods or stems $e$ of the indicator-tablets E, a similar guide-plate 9, that extends between the upper portions of the standards 2, serving to guide the upper ends of the stems of the indicator-tablets. Each of the indicator-tablet rods is shown as provided with the lugs or shoulders $e'$ and $e^2$, the lugs $e'$ resting upon the plate 9 when the tablet is in depressed position and serving to limit the downward movement of the tablet-rods. The lug $e^2$ of each tablet-rod is adapted to contact with the end of its corresponding dog or pawl 10, that is sustained upon a pivot-bar 11, extending between suitable uprights 12, that rise from the locking-bar F, these dogs or pawls 10 serving to temporarily check the downward movement of the lugs $e^2$ and the tablet-rods. By preference each of the pawls 10 is provided at its end with a shoulder or projection 12, which serves to prevent the pawl from swinging too far in backward direction, the weight of the pawl tending to throw it forward, as seen more particularly in Fig. 10 of the drawings. The locking-bar F, whereon the pawls 10 are sustained, rests upon the upper face of the guide-plate 8, (see Fig. 5,) and this locking-bar is held normally drawn toward one end of the plate 8 by means of a coil-spring 13, that connects the locking-bar F with the plate 8 or with some other fixed part of the structure. It will be observed that the pawls are provided with extended hubs (see Fig. 5) which serve to properly space the pawls upon the pivot-bar 11 and insure that each pawl shall extend above its corresponding slot in the guide-plate 8 when the locking-bar F is in its normally-retracted position.

From the construction of parts as thus far defined it will be seen that when a key-lever C has been depressed its rear end will contact with the bottom of the corresponding tablet-rod $e$, thereby elevating such rod until its shoulder $e^2$ contacts with and rises above the corresponding pawl 10 of the locking-bar, and as this pawl 10 will engage with the lug or shoulder $e^2$ it will serve to retain the tablet-rod in elevated position after the key-lever C has been released and until another key has been depressed. In order to insure the dropping of the tablet-rod thus lifted when another key has been depressed to cause another tablet to be exposed to view, I provide the mechanism next to be described. Through an extension $f$ in the locking-bar F passes the releasing-bar F', that is pivoted, as at 14, (see Fig. 2,) to one of the standards 2, this releasing-bar extending also through a long slot 15, formed in the guide-plate 8, and the end of this releasing-bar F' is preferably bent, as shown at $f$, and is beveled, as at 16, so that when the end of the releasing-bar is struck by the correspondingly-beveled striker H in its upward movement the releasing-bar will be forced to move laterally and will cause the locking-bar F to slide laterally, carrying with it the pawls 10, until the pawls pass from beneath the shoulder $e^2$ of the lifted tablet-rod, thereby permitting such tablet-rod to drop until its shoulder $e'$ rests upon the upper guide-plate 9. The striker H, by which the lateral movement of the releasing-bar F' and of the locking-bar F is effected, consists, preferably, of a vibrating arm pivoted, as at $h$, to the inner end of the upper arm $i$ of the vibrating frame I, (see Figs. 2 and 3,) and the beveled upper portion of this striker H is extended inwardly, so that when lifted it will contact with and pass by the forwardly-extended lower end of the releasing-bar F'. The vibrating frame I extends from side to side of the machine and is journaled upon the shaft 3, that sustains the key-levers C, and the end plates of this frame are connected by the transverse bottom bar $i'$, that forms part of the frame. This bar $i'$ extends in rear of the depending arm C' of the key-levers C, so that when any one of the levers is depressed its arms C' will contact with and vibrate the frame I, thereby causing the striker H to be lifted until its beveled end engages the beveled end of the releasing-bar F' and causes this bar to force laterally the locking-bar F and its pawls 10 until these pawls pass from beneath the lugs $e^2$ and release any tablet rod or rods held thereby. It is plain that as the locking-bar F is forced laterally by the releasing-bar F' against the tension of the spring 13 this locking-bar will be drawn to the normally-retracted position seen in Fig. 5 as soon as the striker H has passed above the beveled end $f^2$ of the releasing-bar, and this passing of the striker H above the end of the releasing-bar and the retraction of the locking-bar F occurs before the key-lever has completely lifted the tablet-rod $e$, so that when the lug or shoulder $e^2$ of the tablet-rod passes through the slot in the guide-plate 8 its appropriate pawl 10 will be in position to engage it and prevent the dropping of the tablet.

As it is frequently desirable to expose simultaneously to the purchaser's view several tablets in order to properly indicate the exact amount of the purchase, I provide means whereby the movement of the locking-bar F and consequent release of the sustained tablet may be temporarily prevented while the operation of the desired key-levers is, however, permitted. To the lower end of the striker H is attached the "throw-out" rod M, in the enlarged end $m$ of which is formed the long slot $m'$, through which passes the shaft 3, and in front of the end $m$ of the rod M extends the arm $n$, that is pivotally sustained by the pin 70, that projects from the extension 71 of the adjacent end plate 2. The arm $n$ is preferably provided with an angular extension N, leading through the front of the inclosing casing, and by preference, also, the extension N is connected by means of a bar-key O with a similar extension or arm N', pivoted, as at $N^2$, to a projection 72 of the plate 2 at the opposite side of the machine. My object in thus providing a bar-key O extending across the front of the machine for effecting the operation of the throw-out rod M is to enable this rod to be more conveniently operated than if a single key were attached to the extension or arm N, although such last-mentioned construction would be clearly within the spirit of the invention, which is not designed to be restricted to the specific construction of mechanism for preventing temporarily the operation of the bar that sustains the tablets. From this construction it will be seen that by depressing the bar O at the same time that a key is depressed the arm $n$ will force forward the throw-out rod M, thereby causing this rod to rock the pivoted striker to such extent that as the swinging frame I is lifted the beveled end of the striker will not strike or operate the releasing-bar F'.

As it is desirable that no tablet should be exposed to view until the key-lever C has completed its movement, I have provided the mechanism next to be described, whereby the key-lever will be locked against backward movement until the key has been so completely depressed as to cause a complete lifting of its tablet and a proper movement of the registering-wheels. Upon the inner ends of the arms $i$ of the vibrating frame I is pivotally sustained a swinging frame K, this frame being carried by the pivot-rod $h$, on which is also journaled the striker H. Upon the transverse plate or bar $k$ of this swinging frame K is mounted the sliding pawl 20, this pawl being preferably provided with one or more slots 21, through which pass the screws or studs 22, that serve to retain the pawl in position upon the plate, and from this pawl 20 rises a stud 23, against which bears a spring 24, that has one end fixed, as at 25, to the plate or bar $k$, and serves to force the beveled end of the pawl 20 into normal engagement with the teeth of the rack-bar ratchet-plate 27, that is sustained by a bar 28, which is bolted, as at 29, to the bottom plate $A^2$ of the casing. The rear end of the pawl 20 is provided with an upwardly-extended shoulder 30, with which will engage the shoulder 31 of the trigger 32, that is pivoted, as at 33, to a standard 34, rising from the transverse plate or bar $k$. From this construction it will be seen that when, by the depression of any key and the consequent lifting of the rear end of the key-lever, the vibrating frame is struck by the corresponding arm C' of the key-lever the upper arm $i$ of the vibrating frame will be lifted, and during its upward movement the pawl 20 will ride over the teeth of the rack or ratchet plate 27, being forced into engagement with these teeth by means of the spring 24. It will be observed that each of the key-levers C is provided with a hook $c'$ upon its upper edge, so that when the swinging frame K is raised by the operation of a key-lever the transverse plate $k$ of this swinging frame will pass beneath the hook $c'$ of such key-lever and will prevent the lever from dropping. When, however, the rear end of the key-lever C has been lifted to such extent that the beveled end of the pawl 20 rides against the inclined extension 26 at the top of the rack or ratchet-plate 27, the trigger 32, which rests normally upon the shoulder 30 of the pawl 20 during the lifting of the pawl over the teeth of the ratchet-plate, will drop until its shoulder 31 engages with the upright lug or shoulder 30 of the pawl 20, and consequently will lock the pawl in such manner that its beveled end will no longer engage with the teeth of the ratchet-plate 27, and hence will permit the downward movement of the swinging frame K and of the vibrating frame I. From one of the side plates 80 that serve to sustain the registering-wheels extends a trip-arm 41, which serves to contact with the free end of the trigger 32 as the swinging frame K and the vibrating frame I fall to their normal position, and thereby disengages the shoulder 31 of the trigger from the shoulder 30 of the pawl 20, so as to permit the pawl to be again forced by the spring 24 into position to engage with the ratchet-plate 27. In order to insure that the swinging frame K shall be moved with certainty and with least possible friction into proper position to cause the pawl 20 to engage with the ratchet-plate 27 when the swinging frame and the vibrating frame are dropped, I prefer to employ a roller 45, that is journaled, as at 46, to one of the side plates 80, that sustains the registering-wheels, although it is obvious that an inclined plate or bar would answer the purpose of this roller. From this construction it will be plain that when a key has been struck and the inner end of its lever C' has been raised such key will remain depressed until the key-lever has entirely completed its movement, since until such movement is completed the pawl 20 will remain in engagement with the ratchet-plate 27, and consequently the premature dropping of the lever will be prevented. Hence it will be seen that the pawl and rack or ratchet-plate constitute an arrester, which serves to prevent the bar or plate k from dropping after it has been moved from its normal position by the operation of either of the key-levers until the full movement of such key-lever has been effected, and as this plate or bar k extends across the tops of all the key-levers and is movable up and down therewith throughout their limit of play it is obvious that each of the key-levers may become locked to this plate or bar as soon as it is displaced from its normal position.

In order that the money drawer or till B may remain locked except when the machine has been operated to indicate a purchase, I prefer to provide the improved construction of till-locking mechanism next to be described. Upon the inner face of one of the sides of the till or drawer B is affixed a stud 50, with the beveled face 51 of which will engage the correspondingly-beveled extension 52 of the elbow-lever 53, that is pivoted within suitable brackets 54, depending from the bottom plate $A^2$ of the machine. The upper end 56 of the elbow-lever 53 extends through the bottom plate $A^2$ of the casing and slightly over the transverse bar $i'$ of the vibrating frame I, so that when the vibrating frame is operated by the depression of either of the keys the transverse bar $i'$ will strike the under side of the arm 56 of the elbow-lever, thereby causing this lever to rock until the square end of its extension 52 passes downward and out of engagement with the correspondingly square side of the lug or stud 50. A suitable spring 58, fixed to the upper arm 56 of the elbow-lever, will serve to hold this lever normally in the position shown in Figs. 3 and 4 of the drawings. Hence it will be seen that when, by the operation of the vibrating frame I, the elbow-lever 52 is rocked in such manner as to disengage the stud 50 the coil-spring B' at the back of the till will force the till outward, so as to readily permit the cashier to have access thereto. It is plain, however, that when the elbow-lever has been restored to its normal position by the spring 58 and the till B is moved inward the inclined under side 51 of the lug 50 will contact with the correspondingly-inclined upper side of the extension 52 of the elbow-lever 53, thereby slightly depressing this lever until the lug 50 has passed the extension 52, when the lever will be drawn by the spring 58 into engagement with the square face of the lug, as seen in Figs. 3 and 4 of the drawings.

As it is desirable to prevent the operation at the same time of two or more key-levers, I have provided the construction of stop mechanism next to be described. Upon the top plate $A^2$ of the main casing are fixed the transverse bars 60 and 61, the bar 60 serving to receive the pivot-screws 62, whereby the stops L will be pivotally sustained in lateral position, and the bar 61 serving as a rest for the forward ends of these stops. The stops L consist of a series of plates having oppositely-beveled front ends 63, and having, preferably, shoulders 64, adapted to contact with the shoulders of the adjacent stops. The depending arm C' of each key-lever extends in front of the notch formed by the beveled sides of two adjacent stops L and in close proximity thereto, so that when any key-lever is depressed its depending arm C' will contact with the inclined front ends of the stops L and will cause a lateral displacement of the stops sufficient to permit the movement of the depending arm. These stops L are arranged in such close proximity to each other and to the end plates 2 as to be capable of only enough lateral movement to permit the passage of one of the depending arms at any one time. Hence if by accident more than one key should be struck by the operator the stops L would prevent the depression of the key-levers.

In order to direct attention to the fact that a registration of the amount of the purchase has been made, I provide the novel construction of bell-ringing mechanism next to be described. Upon the shaft 3, and preferably adjacent the end of this shaft, is loosely mounted the ratchet or notched wheel P, (see Fig. 8,) upon the periphery of which rides the lower end of the rod P', that is pivoted about its center, as at $p$, and carries at its upper end the hammer $P^2$, that serves to ring the bell $P^3$, affixed to one of the side plates 2. Upon one of the arms of the vibrating frame I is pivotly mounted the pawl 75, suitably weighted to hold its end in engagement with the teeth of the ratchet-wheel P, so that at each movement of the vibrating frame a partial rotation of the ratchet-wheel will be effected, and consequently a succession of taps of the hammer upon the bell will be produced. It is obvious that by varying the size or shape of the teeth of the ratchet-wheel the extent and loudness of the sounding of the bell can be readily changed. As it is sometimes desirable to throw the bell-ringing mechanism out of action, I prefer to extend through one end of the casing the shaft 76 of a throw-off key or button 77, having an angular end 78 entending into proximity to the rod P'. From this construction it will be seen that when it is desired to throw the bell-ringing mechanism out of action it is only necessary to turn the button 77 in such manner as to cause its end 78 to lift the lower end of the rod P' away from the teeth of the ratchet-wheel P, so that when the ratchet-wheel is revolved the rod P' will not be struck thereby.

The improved mechanism whereby the amounts shown by the indicator-tablets will be registered will next be described. Between suitable vertical plates 80 and 81, that rise from the base-plate $A^2$ of the machine, and upon a shaft 82, that is journaled within said plates, are mounted a series of register-wheels R, S, S', $S^2$, and $S^3$, whereby the amounts of the various purchases will be registered. The wheel R, for convenience termed the "cents-wheel," is preferably marked upon its periphery with a double set of figures, indicating the various multiples of five from zero to ninety-five, and upon this wheel will be registered any amount from five cents up to and including ninety-five cents. The wheels S, S', S², and S³ comprise a series of dollar-wheels, and by preference are each marked upon its periphery with a double set of digits—that is to say, each half of its periphery is marked with a zero-mark and with digits from one to nine, although, if desired, the periphery of these wheels may be marked with a single set of digits and a single zero-mark. It will be readily understood that any desired number of dollar-wheels may be employed. The numbers upon the cents-wheel R correspond with the numbers indicated by the various key-levers from five cents to ninety-five cents, (see Fig. 1,) and in order to insure the movement of the wheel R an extent of revolution corresponding to the value of the key that may be struck I interpose between the key-levers C and this register-wheel R a multiplying gear-wheel T, having its periphery provided with suitable cogs $t$, that mesh with the pinion 84, that is affixed to the register-wheel R and is held upon the shaft 82. (See Fig. 4.) The multiplying gear-wheel T is journaled upon the shaft 85, that passes through the vertical plates 80 and 81, and has its ends sustained by the end plates 2 at the sides of the machine, (see Fig. 2,) and to this multiplying gear-wheel T is suitably affixed or formed in piece therewith a ratchet-wheel T', having its periphery provided with teeth $t'$, adapted to be engaged by the driving-pawl V, that is pivotally sustained by the rod $v$ of the pawl-carrier V', the inner end of the side arms of which is journaled upon the shaft 85. This pawl-carrier V' is preferably formed as a frame having the side arms that are journaled upon the shaft 85, these arms being connected by means of a transverse plate 86, having long slots 87 formed therein to permit the passage of the register-arms D, and by preference, also, beneath this transverse plate 86 extend the shaft $v$ and the bar 88. (See Figs. 3 and 4.) The register-arms D correspond in number with the key-levers C, and the lower end of each of these arms is attached, as at $d$, to its appropriate key-lever. Each of these register-arms is provided with a stop or shoulder $d'$, adapted to engage with the rod or shaft $v$ when the key-lever and the register-arm are lifted, and the position of this shoulder $d'$ upon the register-arm D will determine the extent of movement which each register-arm, and consequently each key, shall impart to the driving-pawl V and through the medium of this pawl and the multiplying gear-wheel to the register-wheel R. Thus by reference to Figs 2, 3, and 4 of the drawings it will be seen that the register-arms D attached to the key-levers C of small denominations have their shoulders or stops $d'$ at a lower point upon the register-arms than the shoulders or stops of the register-arms that are connected to keys for registering amounts of higher denomination. My purpose in thus varying the position of the stops or shoulders $d'$ of the register-arms is to permit a certain degree of lost motion to occur during the operation of the keys before the register-arm shall impart movement to the driving-pawl and the pawl-carrier, and the extent of the lost motion of each register-arm will be in inverse proportion to the value of the key to which such arm is attached. Thus, for example, the register-arm D that is connected to the five-cent key-lever has its shoulder $d'$ very near the bottom of the arm, and nearly the entire movement of this register-arm is lost motion, as when the amount of five cents is to be registered it is only necessary to move the register-wheel R one space, and this will be accomplished by imparting a very slight degree of rotation (the space of one tooth) to the ratchet-wheel T' and the multiplying gear-wheel T. On the other hand, the keys for registering amounts of higher denomination—say, for example, ninety cents—will have their register-arms D provided with stops $d'$, formed very near the end of these arms, because when such keys are operated it is necessary to impart a much greater extent of revolution to the register-wheel R and the multiplying gear-wheel T and ratchet-wheel T', and in case of the ninety-five-cent key-lever the register-arm D of this lever has its shoulder $d'$ formed so near its upper end that there is practically no lost motion in the operation of this key lever.

From the foregoing construction the operation of the registering mechanism as thus far defined will be seen to be as follows: When a key is depressed—say, for example, the eighty-cent key—the partial movement of the key-lever C will cause a partial movement of the corresponding register-arm D, and as soon as the stop or shoulder $d'$ of this register-arm contacts with the transverse rod or shaft $v$ of the pawl-carrier it will force this pawl-carrier and the pawl V upward during the remainder of the upward movement of the key-lever, and as the pawl-carrier and pawl are thus moved upward they will cause a partial rotation of the ratchet-wheel T' and multiplying gear-wheel T, which, through the medium of the pinion 84, will be transmitted to the register-wheel R. In order to carry to the dollar-wheels the sum of the revolution of the cents-wheel R, as I prefer to do, I provide the periphery of this register-wheel R with a segment gear-plate 90, with which will engage a pinion 91, that is affixed to a shaft 92, journaled in the vertical plates 80 and 81. (See Figs. 1, 3, 4, 7, and 14.) Hence it will be seen that each time a complete revolution of the register-wheel R is effected the segment gear-plate 90 will cause a partial rotation of the pinion 91, and as this pinion 91 is also in gear with a gear-wheel 92 upon the periphery of the dollar-wheel S a corresponding partial rotation will be imparted to the dollar-wheel sufficient to move this wheel the distance of the space between the figures on its periphery. Hence if after the operation of the eighty-cent key-lever, as above described, the fifty-cent lever should be depressed the cents-wheel R would register "30" and the dollar-wheel S would register "1," thus showing that one dollar and thirty cents had been registered. I prefer to place above the register-wheels a suitable plate or plates W, sustained by the end plates 80 and 81 and provided with a suitable sight-opening $w$, through which the figures upon the periphery of the register-wheels can be seen. In order to transmit to the dollar-wheel S′ the sum of the amounts registered by the revolutions of the dollar-wheel S, I have provided this dollar-wheel S with two segment gear-plates $s$, each adapted to engage with the pinion 95, affixed upon the shaft 92, my reason for providing this dollar-wheel S with two segment-plates being to impart a movement to the next dollar-wheel S′, which registers tens of dollars, a partial movement each time a zero-point of the dollar-wheel S is reached. In like manner also the dollar-wheel S′ will be provided with segment gear-plates adapted to transmit motion through a pinion upon the shaft 92 to the next dollar-wheel $S^2$, and so on to the end of the series. The periphery of the cents-wheel R is provided with the cog-teeth 100, and in like manner the periphery of each of the dollar-wheels S, S′, $S^2$, and $S^3$ is provided with gear-teeth 101, and with the gear-teeth of these several wheels will engage the pinions X, that are affixed to the shaft $x$, that extends transversely across the register-wheels and is journaled in the movable plates X′, the opposite ends of which are mounted upon the rod $x'$, that extends between the upper portions of the vertical plates 80 and 81. Upon the rod $x'$ is mounted, also, a coil-spring 110, one arm of which bears beneath a transverse plate $x^2$, that connects the plates X′ and tends to constantly raise the plate X′ and hold the pinions X out of engagement with the gear-teeth 100 and 101 of the register-wheels. The opposite end of this coil-spring 110 is extended downward and bears against the shaft 111, that is held between the vertical plates 80 and 81. The plates 80 and 81 are provided with the slots 112, through which the ends of the shaft $x$ will pass, so as to permit a vertical movement to this shaft, and one end of the shaft $x$ will be squared, so as to permit the shaft to be turned by a crank or key when desired to reset the register-wheels to their zero-marks. From the plate $x'$ projects an arm $X^3$, which serves to depress the shaft $x$ and the pinions X into engagement with the gear-teeth 100 and 101 upon the peripheries of the register-wheels, and it is plain that when the pinions are thus in engagement with the gear-teeth of these wheels the turning of the shaft $x$, by a suitable key or crank fitted over its squared end, will revolve the register-wheels until the blank spaces 114, formed in the gear-teeth 100 and 101, come beneath the pinions X. These blank spaces 114 are formed at such point in the gear-teeth 100 and 101 that they will come beneath the pinions X when the zero-marks of the register-wheels are opposite the sight-opening $w$ in the top plate W. It is plain that as soon as the several register-wheels have been thus restored to the zero-points the pressure upon the arm $X^3$ will be released and the spring 110 will lift the pinions X out of engagement with the gear-teeth beneath them.

In order to throw the carrying mechanism out of gear during the operation of the resetting-pinions X, as above described, I have so mounted the shaft 92 that sustains the carrying-pinions 91 (see Fig. 7) that this shaft can be moved laterally a sufficient distance to permit its teeth to be disengaged from the teeth of the various segment gear-plates of the register-wheels, and in order to effect the lateral movement of the shaft 92 and the gear-pinions 91 at the same time that the resetting-pinions X are thrown into action, I provide an elbow-lever 120, that is pivotally sustained by an arm 121, that projects from the plate 80, and the upper end of this elbow-lever 120 extends beneath one of the plates X′, that sustains the resetting-pinions $x$, so that when the plate X′ is depressed it will bear upon the upper end of the elbow-lever 120, causing this lever to turn about its pivoted point and causing its lower end to move laterally the shaft 92 to such extent as to throw the pinions 91 out of the paths of the segment gear-plates upon the register-wheels. Hence it will be seen that during the resetting of the register-wheels the carrying mechanism will be thrown out of action.

In order to restore the carrying mechanism to proper position for engagement with the segment gear-plates of the register-wheels, I prefer to extend the end of the shaft 92 beyond the vertical plate 80, and to place upon this shaft a coil-spring 125, that will bear against a pin on the shaft and against the plate 80, and will tend to hold the shaft normally in the position shown by Fig. 7 of the drawings.

Upon the rod or shaft 111, that extends between the upper portions of the end plates 80 and 81, (see Figs. 1 and 4,) are mounted a series of check-pawls 130, the front ends of which engage with notches 131, formed in the peripheries of the several register-wheels, these front ends of the pawls 130 being held constantly in position to engage with the notches by means of the coil-springs 132, that connect the rear ends of the pawls 130, and a suitable transverse rod 133, extending between the plates 80 and 81.

To avoid all danger of the register-wheels being moved by a sudden or violent depression of a key-lever a greater distance than the space corresponding to said lever, I prefer to provide a wheel-arrester Y, (see Fig. 13,) that is pivoted, as at 140, (see Fig. 3,) to the vertical plate 80, the lower end of this wheel-arrester being extended downwardly into position to be struck by the transverse bar $i'$ of the vibrating frame I just at the time that the vibrating frame is completing its upward movement, and the upper end of this wheel-arrester Y extends between the register-wheels R and S, and is provided with the fork-shaped end $y$, having the points $y'$, that will engage with the notches 131 of the register-wheel. It will be observed that the body of the wheel-arrester Y is bent in order to permit it to be properly placed with respect to the register-wheels and to prevent its interference with any of the adjacent parts. From this construction it will be seen that when a key-lever is depressed and its register-arm D is raised, carrying with it the driving-pawl V and pawl-carrier V', the transverse bar $i'$ of the vibrating frame I will contact with the lower end of the wheel-arrester Y about the time that the key-lever and the register-arm are completing their upward stroke, and will force the points $y'$ of the wheel-arrester into the appropriate notches 131 of the register-wheels R and S. It is obvious that, if desired, the wheel-arrester Y may be applied to the register-wheel R only, although for greater security I prefer to employ the wheel-arrester in connection with the first of the dollar-wheels S also. A suitable coil-spring is attached to the lower end of the wheel-arrester Y and the plate 80, in order to hold the upper end of the wheel-arrester in retracted position, so as not to engage with the register-wheels until it is struck by the vibrating frame.

To insure that the pawl-carrier V' shall descend to its proper position after the release of any key that has been struck, I prefer to employ suitable screws 150, that pass through threaded openings in suitable brackets 151, projecting from the lower guide plate 8, the upper ends of these screws extending into position to bear against the under side of the bar 88, that extends between the pivoted arms of the pawl-carrier. If desired, only one screw 150 need be employed, although I prefer to employ two or more different points, so as to better arrest the backward movement of the pawl-carrier at the proper time.

In order to permit the dollar-wheels to be operated independently of the cents-wheel, I prefer to employ for the first of the dollar-wheels S a multiplying gear-wheel $T^2$, (see Figs. 1 and 4,) which engages with a pinion 160, that is fixed to one side of the dollar-wheel S, and to this multiplying gear-wheel $T^2$ is affixed a ratchet-wheel $T^3$, with which will engage a driving-pawl $T^4$, that is pivoted, as at 170, to the front of the pawl-carrier 171, this driving-pawl $T^4$ being forced into normal engagement with the teeth of the ratchet-wheel by means of a coil-spring $172^a$, that is carried upon the end of the cross-bar 172 of the pawl-carrier. This cross-bar 172 is fixed to the front ends of the arms 173 of the pawl-carrier, these arms being journaled upon the shaft 85 and having their ends connected by means of a cross-plate 174, that is provided with slots 175, through which pass the register-arms that are attached to the dollar-registering key-levers C. My object in thus extending the cross-bar 172 of the pawl-carrier across the front of the machine in the manner shown is to bring the driving-pawl $T^4$ into proper position for engagement with the ratchet-wheel $T^3$ without danger of its interfering with other parts of the mechanism. From the foregoing construction it is plain that if either of the dollar-keys be depressed the register-arm D of such key will be lifted and will cause a corresponding movement of the pawl-carrier and of the driving-pawl $T^4$, it being understood, of course, that each of the register-arms of the dollar-key levers will have its shoulder or stop $d'$ placed at the proper distance to give the correct degree of rotation to the dollar-register wheel S. It is obvious that, if desired, a pawl-carrier similar to that shown for the "cents-registering wheel" or the dollar-wheel S may be employed in connection with key-levers registering high amounts—such, for example, as from ten dollars to ninety dollars—in which case a multiplying gear-wheel and ratchet-wheel would also be employed in connection with the dollar-wheel S', which is designed to register dollars above nine.

As it is sometimes desirable to adapt machines for indicating and registering not merely dollars and fractions of dollars in the multiples of five, but as well also to register cents below five cents, I provide what, for convenience, may be termed a "one-cent-registering wheel," designed to register, preferably, from one to four cents, and I prefer to employ also suitable indicator-tablets and tablet-rods similar to those hereinbefore described, whereby the like amounts can be indicated to the purchaser's view. In Fig. 13 of the drawings is shown a construction of mechanism adapted to register and indicate from one to four cents. This mechanism does not differ materially from that hereinbefore described, but consists simply in the addition of a cent-registering wheel Z, that is journaled upon the shaft 82 and has its periphery marked with four sets of figures, each set consisting of the digits 1, 2, 3, and 4 and a zero-mark. Affixed to this one-cent-register wheel Z is a pinion 180, with which will engage a multiplying gear-wheel 181, corresponding precisely with the multiplying gear-wheel T and the multiplying gear-wheel $T^2$, hereinbefore described, and affixed to this gear-wheel 181 is a ratchet-wheel 182, with which will engage a driving-pawl 183, that is carried upon the bar 184 of the pawl-carrier 185, the arms of which pawl-carrier are journaled upon the shaft 85, and are connected at their rear end by the transverse plate 186, having slots 187 to admit the registering-arms D of the corresponding key-levers. The driving-pawl 183 is held in normal engagement with the teeth of the ratchet-wheel 182 by means of a coil-spring 188 on the bar 184. By reference more particularly to Fig. 12 of the drawings it will be seen that the periphery of the wheel Z is provided with four segment gear-plates 190, adapted to engage at intervals with a pinion 191, so that as often as the one-cent-registering wheel Z is turned five spaces or from one zero-point to the next a partial revolution will be given by the segment gear-plate to the registering-wheel R. It will be understood that when a one-cent-registering wheel Z is employed the registering-wheel R will be provided upon its periphery with gear-teeth 194, corresponding with similar gear-teeth upon the dollar-registering wheels and adapted to engage with the pinion 191 of the carrying mechanism. It will also be seen that the periphery of the registering-wheel Z is provided with gear-teeth 195, with which will engage the resetting pinion 196, that is carried by the extended portion of the shaft $x$. When a one-cent-registering wheel is thus employed, the shaft $x$ will simply be extended and the plates X', which carry the shaft, will also be brought to the position shown in Fig. 12 of the drawings. From the foregoing description it will be seen that when a purchase of the value of one, two, three, or four cents is made the cashier by depressing the proper key can indicate to the purchaser's view the amount of the purchases, and at the same time can register upon the wheel Z such amount.

Having thus described my invention, what I claim as new, and desire to secure by Letters Patent, is—

1. In a cash register and indicator, the combination, with suitable key-levers, of tablet-rods $e$, provided with the upper and lower lugs or shoulders $e'$ and $e^2$, the upper guide-plate 9 to engage the upper lugs or shoulders $e'$, and a suitable means for engaging the lower lugs or shoulders $e^2$, substantially as described.

2. In a cash register and indicator, the combination, with suitable key-levers and with tablet-rods provided with lugs or shoulders, of a laterally-movable locking-bar provided with individual pawls movably mounted thereon to engage with the lugs or shoulders of the tablet-rods, substantially as described.

3. In a cash register and indicator, the combination, with suitable key-levers and with tablet-rods provided with lugs or shoulders, of a laterally-movable locking-bar provided with individual pawls movably mounted thereon to engage with the lugs or shoulders of the tablet-rods, a releasing-bar for imparting lateral movement to said locking-bar, and a suitable striker for operating said releasing-bar, substantially as described.

4. In a cash register and indicator, the combination, with suitable key-levers and with tablet-rods provided with lugs or shoulders, of a laterally-movable locking-bar provided with individual pawls to engage with the lugs or shoulders of the tablet-rods, a pivoted releasing-bar for imparting movement to said locking-bar, said releasing-bar having a beveled end, and a striker having a beveled end for engaging said releasing-bar, substantially as described.

5. In a cash register and indicator, the combination, with suitable key-levers and with suitable tablet-rods, of suitable mechanism for engagement with said tablet-rods to lock or check the movement of said tablet-rods, a suitable releasing mechanism for moving said locking mechanism, and a suitable throw-out device for preventing the operation of the releasing mechanism when it is desired to retain a tablet in raised position, substantially as described.

6. In a cash register and indicator, the combination, with suitable key-levers and with suitable tablet-rods having lugs or shoulders, of a suitable locking-bar for engagement with said lugs or shoulders to check the movement of said tablet-rods, a suitable releasing-bar for moving said locking-bar, a suitable striker for operating said releasing-bar, and a throw-out rod for preventing the operation of said releasing-bar, substantially as described.

7. In a cash register and indicator, the combination, with suitable key-levers and with suitable tablet-rods, of a suitable locking-bar for checking the movement of said tablet-rods, a suitable releasing-bar for moving said locking-bar, a suitable striker for operating said releasing-bar, a throw-out rod for preventing the operation of said releasing-bar, and a suitable key for moving said throw-out rod, substantially as described.

8. In a cash register and indicator, the combination, with suitable key-levers and with tablet-rods, of a locking-bar for checking the movement of said tablet-rods, a releasing-bar for moving said locking-bar, a pivoted striker for operating said releasing-bar, a throw-out rod for operating said pivoted striker, and a vibrating frame for carrying said striker, substantially as described.

9. In a cash register and indicator, the combination, with suitable key-levers and with tablet-rods, of a locking-bar for checking the movement of said tablet-rods, a releasing-bar for moving said locking-bar, a striker for operating said releasing-bar, a throw-out rod for throwing said striker out of action, a suitable key-bar extending across the casing, and a suitable pivoted arm connected with key-bar and engaging the throw-out rod, substantially as described.

10. In a cash register and indicator, the combination, with suitable key-levers and with a vibrating frame, of a movable frame for engagement with said key-levers, a pawl carried by said movable frame, a trigger for holding said pawl temporarily retracted, and a ratchet-plate provided with an extension for moving said pawl beyond the line of the teeth of said ratchet-plate, substantially as described.

11. In a cash register and indicator, the combination of suitable key-levers provided with hooks, a vibrating frame operated by said key-levers, a movable frame carried by said vibrating frame, a ratchet-plate, a pawl carried by said movable frame to engage said ratchet-plate, and a trigger for holding said pawl temporarily retracted to permit the backward movement of the vibrating frame, substantially as described.

12. In a cash register and indicator, the combination, with suitable key-levers and with a vibrating frame, of a swinging frame carried by said vibrating frame, a pawl mounted upon said swinging frame, a trigger for holding said pawl temporarily retracted, a spring for said pawl, a ratchet-plate having an extension for moving said pawl beyond the line of the ratchet-teeth, and a suitable trip for releasing the trigger when the swinging frame is dropped, substantially as described.

13. In a cash register and indicator, the combination, with a change drawer or till, with the key-levers, and with a vibrating frame extending into position to be engaged by said key-levers, of an elbow-lever pivotally sustained and having one arm extending into proximity to said vibrating frame so as to be operated thereby, and having its other arm extending into the drawer or till, and a lug or extension within the till to engage with said elbow-lever, substantially as described.

14. In a cash-register, the combination of a series of key-levers C, having projecting arms C', extending at an angle therefrom, and a series of pivoted stops L for preventing the simultaneous operation of two or more of the key-levers of said series, substantially as described.

15. In a cash register and indicator, the combination, with the key-levers and with a vibrating frame operated by said key-levers, of a ratchet-wheel, a pawl upon said vibrating frame for operating said ratchet-wheel, a bell-ringing bar in engagement with said ratchet-wheel, and a bell, substantially as described.

16. In a cash register and indicator, the combination of key-levers C, having depending arms C', and a vibrating frame having a transverse bar extending in front of said depending arms and into position to be struck by said depending arms, substantially as described.

17. In a cash-register, the combination, with suitable key-levers, of register-wheels mounted upon a common shaft, one or more of said wheels being provided with a pinion, a multiplying gear-wheel engaging with said pinion, a ratchet-wheel connected with said multiplying gear-wheel and mounted upon the same shaft, a driving-pawl for imparting movement to said ratchet-wheel, and suitable register-arms or connections for transmitting movement from the key-levers to the ratchet-wheel, substantially as described.

18. In a cash-register, the combination, with suitable key-levers, of register-wheels mounted upon a common shaft, one or more of said wheels being provided with a pinion, a multiplying gear-wheel engaging with said pinion, a ratchet-wheel connected with said multiplying gear-wheel and upon the same shaft, a driving-pawl for imparting movement to said ratchet-wheel, and suitable register-arms having stops or shoulders at different points between the key-levers and the driving-pawl, whereby different extents of rotation may be imparted to the ratchet-wheel, substantially as described.

19. In a cash-register, the combination, with suitable key-levers, of register-wheels, one or more of said wheels being provided with a pinion, a multiplying gear-wheel engaging with said pinion, a ratchet-wheel connected with said multiplying gear-wheel, a driving-pawl for imparting movement to said ratchet-wheel, a pawl-carrier for said driving-pawl, having a bar extending across the key-levers, and register-arms extending from the key-levers to the bar of said pawl-carrier, said register-arms having stops or shoulders at different points in their lengths, whereby different extents of rotation may be imparted by the key-levers to the driving-pawl, substantially as described.

20. In a cash-register, the combination of a register-wheel for registering fractions of a dollar, one or more dollar-registering wheels, a carrying mechanism connecting said wheels, a multiplying gear-wheel and a pinion connected with one of said register-wheels, a ratchet-wheel connected with said multiplying gear-wheel, and a series of key-levers for imparting different degrees of rotation to said ratchet-wheel, substantially as described.

21. In a cash-register, the combination, with a register-wheel for registering fractions of a dollar in multiples of five and a series of dollar-registering wheels located upon the same shaft with said wheel that registers fractions of a dollar, an individual pawl-and-ratchet mechanism for said wheel that registers fractions of a dollar, an individual pawl-and-ratchet mechanism for one of said dollar-wheels, and a carrying mechanism for imparting movement to the dollar-registering wheels from the wheel that registers the fractions of a dollar, substantially as described.

22. In a cash-register, the combination, with suitable key-levers and with a register-wheel for registering fractions of a dollar in multiples of five and a wheel for registering dollars, of individual pawls and ratchet-wheels for each of said register-wheels, and suitable pawl-carriers for sustaining said pawls on opposite sides of the wheels, substantially as described.

23. In a cash-register, the combination, with suitable key-levers, of register-wheels, one or more of said wheels being provided with a multiplying gear-wheel, a ratchet-wheel for operating said multiplying gear-wheel, a pawl, a pawl-carrier having a bar extending across the keys at the rear side of the multiplying gear-wheel, and suitable register-arms connected to the keys and serving to impart to the pawl-carrier different degrees of rotation, substantially as described.

24. In a cash-register, the combination, with register-wheels, of a ratchet-wheel for imparting movement to one of said register-wheels, a pawl and pawl-carrier for operating said ratchet-wheel, and an adjustable stop for determining the downward movement of said pawl-carrier, substantially as described.

25. In a cash-register, the combination, with suitable keys, of a series of register-wheels provided with gear-teeth, carrying-pinions for connecting said register-wheels, a longitudinally-movable shaft for said pinions, and suitable means for moving said shaft to throw said pinions out of action, substantially as described.

26. In a cash-register, the combination, with suitable keys, of a series of register-wheels provided with gear-teeth, carrying-pinions for connecting said register-wheels, a longitudinally-movable shaft for said pinions, cog-wheels for restoring said register-wheels to their zero-points, and a movable shaft whereon said cog-wheels are carried, substantially as described.

27. In a cash-register, the combination, with suitable key-levers and with a wheel adapted to register multiples of five, of a register-wheel Z for registering cents below the amount of five cents, suitable pawl-and-ratchet mechanism for imparting movement to said register-wheel, and a carrying mechanism for transmitting motion from said register-wheel to another register-wheel that registers amounts of higher denomination, said carrying mechanism comprising a series of segmental gear-plates affixed to said register-wheel Z and carrying-pinions for engagement with said segmental gear-plates and with the gear-teeth of wheels of higher denomination, substantially as described.

28. In a cash-register, the combination, with suitable key-levers and with a wheel adapted to register multiples of five, of a register-wheel Z for registering cents below the amount of five cents, a multiplying gear-wheel connected with said register-wheel, suitable pawl-and-ratchet mechanism for operating movement to said multiplying gear-wheel, suitable graduated arms for connecting said pawl-and-ratchet mechanism with the key-levers, and a carrying mechanism for transmitting motion from said register-wheel to another register-wheel, substantially as described.

29. In a cash-register, the combination, with suitable key-levers and a vibrating frame operated by said levers, of register-wheels and a wheel-arrester having its upper end adapted to engage with and check the register-wheels and having its lower end extending into the path of said vibrating frame, whereby when said frame is operated the wheel-arrester will be thrown into action, substantially as described.

30. In a cash-register, the combination, with suitable key-levers and a vibrating frame operated by said levers, of several register-wheels and a wheel-arrester having points to check the movement of two or more of said register-wheels, substantially as described.

JAMES L. TOWNSLEY.

Witnesses:
GEO. P. FISHER, Jr.,
JAMES H. PEIRCE.